G. E. WATERS AND G. M. STEVENSON.
LUMBER TRUCK.
APPLICATION FILED OCT. 9, 1919.
1,390,321.
Patented Sept. 13, 1921.
2 SHEETS—SHEET 2.
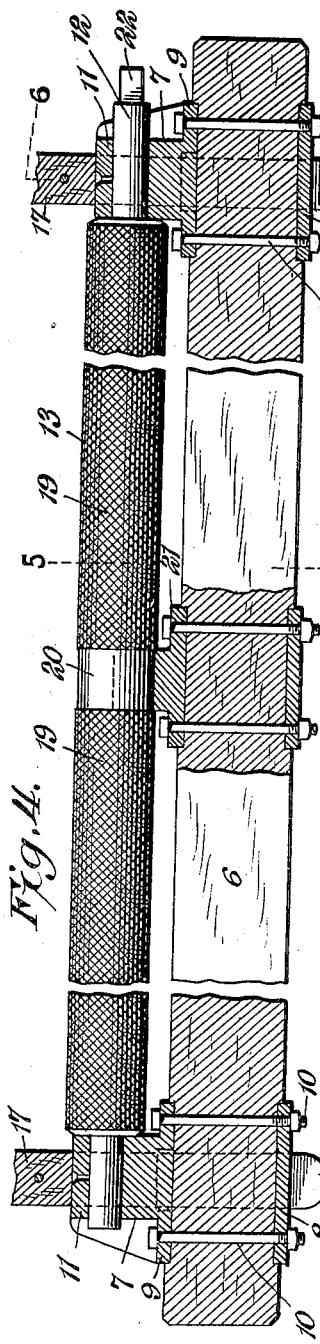
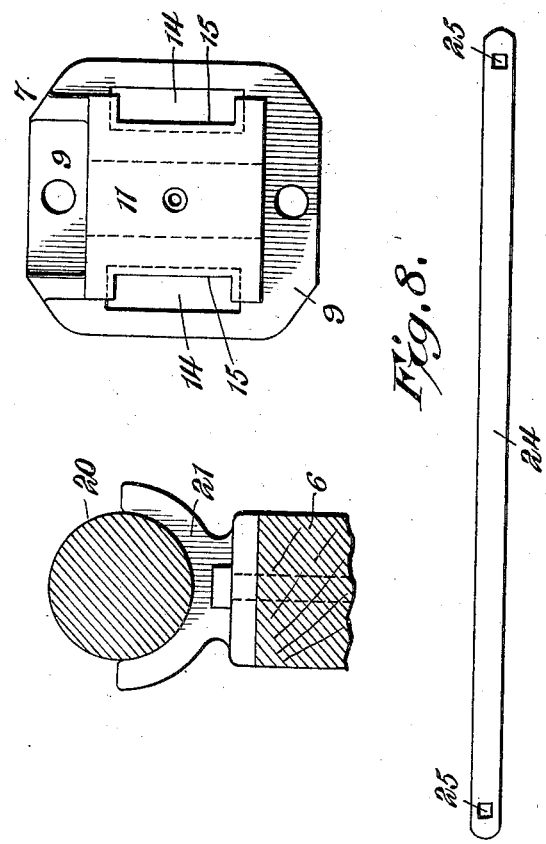
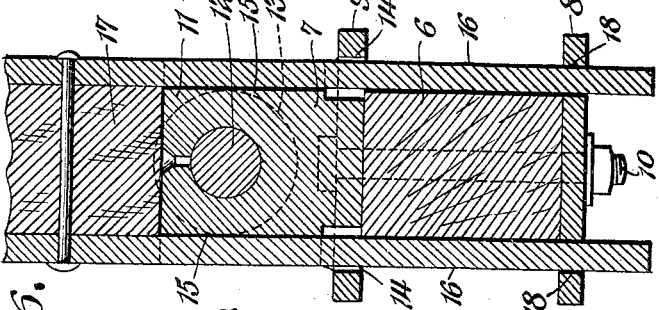
WITNESSES
Howard D. Orr.
H. T. Chapman.
G. E. Waters and
G. M. Stevenson, INVENTORS,
BY C. G. Siggers.
ATTORNEY

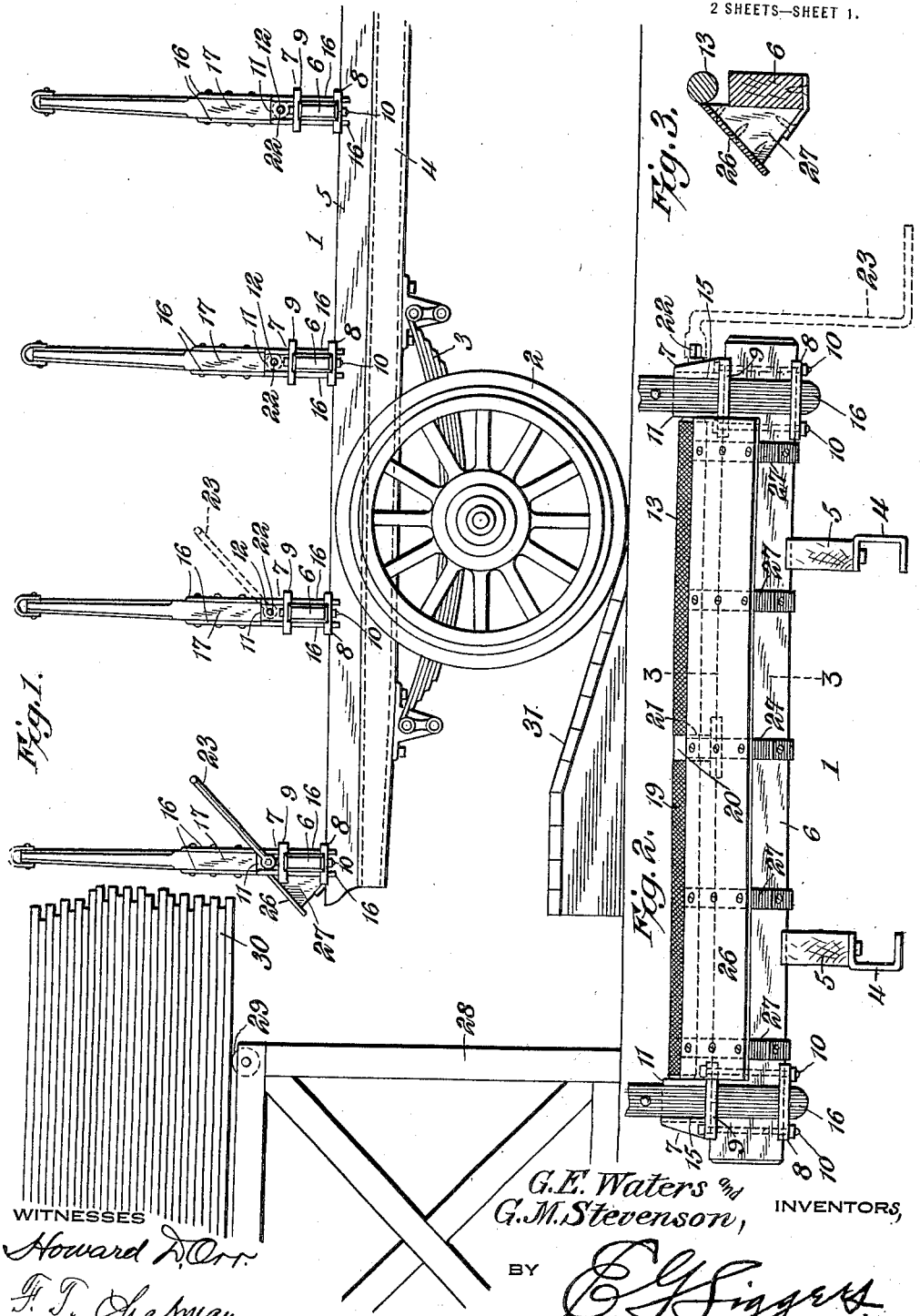

UNITED STATES PATENT OFFICE.

GEORGE E. WATERS AND GEORGE M. STEVENSON, OF BALTIMORE, MARYLAND.

LUMBER-TRUCK.

1,390,321.　　　　Specification of Letters Patent.　Patented Sept. 13, 1921.

Application filed October 9, 1919. Serial No. 329,489.

*To all whom it may concern:*

Be it known that we, GEORGE E. WATERS and GEORGE M. STEVENSON, citizens of the United States, residing at Baltimore in the city of Baltimore and State of Maryland, have invented a new and useful Lumber-Truck, of which the following is a specification.

This invention has reference to lumber trucks, and its object is to provide a body structure for vehicles, especially automobiles, whereby loads of lumber may be quickly placed on the truck and quickly dumped therefrom, thus greatly facilitating the transportation of lumber from place to place, and shortening the time of loading and unloading over the usual practice.

In accordance with the invention, the vehicle, which for convenience of description will be considered as an automobile, is provided with a truck body which in the main may be of usual construction and this body is provided with a floor or support composed of a series of rollers capable of operation to move the load already assembled onto the truck body lengthwise of the latter, and by securing one or more of the rollers, hold the load on the body against slipping. In this manner a load of lumber may be piled upon a suitable support to which the truck may be backed in a manner to have the rear of the truck under-ride the load and thereby lift the latter for a short distance, whereupon by rotating one roller after the other, the load may be drawn onto the truck until completely lodged thereon. As soon as this is accomplished, a suitable number of rollers is locked against rotation, and by having the rollers roughened, not only is the movement of the lumber onto the truck facilitated, but accidental discharge of the load is prevented even on relatively steep grades. When, however, it is desired to discharge the load, the unlocking of the rollers and a reversal of the movement of the rollers is all that is necessary to remove the load from the truck where it is desired the load should be deposited.

The invention will be best understood from a consideration of the following detailed description taken in connection with the accompanying drawings forming a part of this specification, with the understanding, however, that the invention is not confined with any strict conformity to the showing of the drawings, but may be changed and modified so long as such changes and modifications mark no material departure from the salient features of the invention as expressed in the appended claims.

In the drawings:

Figure 1 is an elevation of a truck embodying the invention and showing a loading platform for the preliminary lodging of the load to be moved onto the truck.

Fig. 2 is an end elevation of the truck, omitting certain parts.

Fig. 3 is a section on the line 3—3 of Fig. 2, omitting distant parts.

Fig. 4 is a longitudinal section through the truck where supporting one of the rollers, the drawing being on a larger scale than in the preceding figures.

Fig. 5 is a section on the line 5—5 of Fig. 4, distant parts being omitted.

Fig. 6 is a section on the line 6—6 of Fig. 4.

Fig. 7 is a top plan view of one of the journal supports for the roller.

Fig. 8 is plan view of a locking bar for the rollers.

Referring to the drawings, there is shown a truck body 1 mounted upon rear wheels 2 and springs 3, this showing being deemed sufficient to indicate a truck body without more detailed showing or description. In the particular arrangement shown, the chassis may include channel beams 4 and sills 5 mounted thereon, the sills carrying and being connected by cross beams 6. Near their ends the cross beams carry blocks 7 resting on the cross beams and held thereto by plates 8 which under-ride the cross beams and connected to earplates 9 of the blocks 7 by bolts 10 or in any suitable manner. The blocks 7, which are in effect journal blocks, are provided with journal caps 11 holding in place journal extensions 12 of the ends of rollers 13, which rollers are long enough to extend from one side to the other of the truck body.

The blocks 7 have slots 14 on opposite sides and each cap plate 11 has recesses 15 corresponding in position to the slots 14. The slots and recesses are arranged to receive side strips or plates 16 fast to opposite sides of stakes 17 such as are customarily employed for holding loads on trucks. The strips or plates 16 are long enough to not only traverse the slots 14 but to extend on opposite sides of the cross beams 6 and through slots 18 in the plates 8, whereby the stakes are firmly held in place but may be readily removed as needed.

The surface of each roller 13 is knurled as shown at 19, except that at one portion, say, about intermediate of the length of the roller, it has a smooth face portion 20 to permit the roller to there seat in an open bearing 21 secured to an intermediate portion of the corresponding cross beam 6.

One end journal member 12 of each roller 13 terminates in a squared extension 22 to receive the socket end of a crank handle 23 whereby an operator standing at the side of the truck may conveniently rotate the roller. There is also provided a bar 24, shown in Fig. 8, this bar having squared perforations 25 near its end spaced apart a distance equal to the spacing of two adjacent squared ends 22, whereby two of the rollers may be locked together against rotation. The invention is not necessarily confined to squared ends for the rollers or a single locking bar with the squared perforations, since the purpose is to hold the rollers against rotation and any other suitable means to accomplish this may be employed.

At the rear end of the truck closely adjacent the rear roller 13 is an inclined tail strip or wear plate 26 supported by brackets 27 fast to the neighboring cross bar 6. This wear plate 26 serves as a guide for directing a load onto the truck and also as a starting chute for the load in leaving the truck, whereby any drop of the load on leaving the truck is avoided.

At the lumber yard there is provided a loading platform 28 of suitable construction and height and provided with rollers 29 to support a pile of lumber 30. Adjacent to the loading platform 28 is an incline 31 of sufficient height that when the rear wheels of the truck are run upon the platform, the body 1 of the truck is elevated sufficiently to underride and have the rear roller also under-ride and engage the under portion of the load 30 where projecting from the loading platform or frame, thus slightly lifting the load and supporting the under-ridden portion thereof by the rear portion of the automobile truck.

In the operation of the invention the load of lumber may be assembled on the loading platform in the absence of the automobile truck so as to be ready for movement onto the truck as soon as the automobile is available. It may be considered that the truck has been absent on the delivery trip and while so absent a load of lumber has been assembled ready to be transferred to the truck. Ordinarily such assemblage of the load may take place during the absence of the truck so that no time is lost and the load is ready by the time the truck returns. With the assembled load positioned similarly to the arrangement shown in Fig. 1, the truck is backed up the incline 31, thus bringing the rear roller 13 underneath the overhanging portion of the load and slightly raise the load from the supporting roller 29. Now by applying the crank 23 to the rearmost roller and turning the latter in the proper direction the load is drawn from the frame or platform 28 onto the truck body 1. When the load is advanced far enough to reach the second roller 13 the crank 23 may be transferred to the second roller from the rear and the load be farther drawn onto the truck, the operation being continued until the load is wholly on the truck. Then the bar 24 is applied to any two adjacent rollers, say the rear rollers. The locking bar holds the rollers against rotation and the surfaces of the rollers, being roughened by knurling, present such frictional engagement with the bottom layer of the load that the load is maintained on the truck against all ordinary traveling conditions which would tend to discharge the load. When the destination is reached the locking bar is removed and by the application of the crank 23 to an appropriate one of the rollers the load is propelled from the truck to the place to receive it, the rear end of the load gravitating down the plate or chute 26, thus saving the rear portion of the truck body from harm and correspondingly saving the end of the load last leaving the truck. The discharge of the load is thus expeditiously performed and the truck may return to the lumber yard for another load without any material loss of time, the workmen at the yard in the meantime assembling the other load to be placed upon the truck also without any material loss of time.

In this manner numerous loads may be placed upon the truck and delivered in the time usually occupied in placing a single load upon the truck and delivering such load at the point of destination.

While rollers have heretofore been used as the supporting means for loads and in some instances the rollers have been provided with tongues or longitudinal ribs, such structures are detrimental to the underlayer of the load by marring the material of the load, especially when lumber composes the load. By employing a knurled surface the objections to rollers as previously employed are avoided. The lumber often contains more or less sap or pitch, and this quickly clogs the spaces between the ribs, while tongues are liable to produce indentations which mar the surface of the wood. Knurled surfaces, however, are in no wise harmful to the surface of the wood and quickly clear from any deposited sap or pitch. The tongues or grooves when employed on rollers have been found in practice to easily choke and need special cleaning instead of being self-cleaning as are knurled surfaces.

What is claimed is:

1. Means for loading lumber for transportation, comprising an elevated platform for receiving a pile of lumber, a lumber receiving truck with a roller bed and means for actuating the rollers to propel the lumber from the platform to the truck, and means for causing the truck to rise under and engage the assembled pile of lumber for movement of the latter by the rollers onto the roller bed of the truck.

2. Means for loading lumber for transportation, comprising an elevated platform for receiving a pile of lumber, a lumber receiving truck with a roller bed and means for actuating the rollers individually to propel the lumber from the platform onto the truck, and means for causing the elevation of the truck under and into engagement with the assembled pile of lumber to raise the latter and permit the actuation of the rollers to cause the movement of the pile of lumber onto the roller bed of the truck.

3. Means for transporting lumber comprising a truck with a bed composed of rollers each having end journals and an intermediate smooth journal surface, the portion of the surface of the roller between the end and intermediate journals being knurled, and journal bearings on the truck for the end and intermediate journals.

4. Means for transporting lumber comprising a truck with a body portion provided with transverse beams, journal bearings carried by the transverse beams, and rollers mounted in the journal bearings, said journal bearings being each provided with sockets for receiving stakes.

5. Means for transporting lumber comprising a truck, rollers constituting the lumber-receiving bed of the truck, journal bearings for the ends of the rollers, each bearing being formed with passages at the sides of the journal receiving portions of the bearings, and stakes having strips spaced to enter the passages in the journal bearings.

6. Means for transporting lumber comprising a vehicle having a roller bed, journal bearings for the rollers with each journal bearing provided with passages or sockets, and stakes adapted to said passages or sockets.

7. Means for transporting lumber, comprising a vehicle with a roller bed to receive the lumber, each roller being provided with journal bearings and each journal bearing having a socket or receptacle as an integral portion thereof for the reception of a stake.

8. Means for transporting lumber comprising a vehicle having a body portion provided with transverse rollers spaced apart lengthwise of the vehicle to constitute a roller bed for lumber, the rollers having journal bearings on the body with stake sockets forming integral parts of the bearing structure.

9. Means for transporting lumber comprising a vehicle with a roller bed, and journal blocks mounted on the vehicle to receive the journals of the rollers, said journal blocks having passages therethrough to constitute receptacles for load-holding stakes.

10. Means for transporting lumber comprising a vehicle with a body portion provided with cross-beams, journal bearings mounted on the cross-beams, rollers mounted in the journal bearings and constituting a roller bed for the lumber, and stakes with strips or plates forming continuations thereof and spaced apart to straddle the cross-beams, the journal bearings having passages therethrough on opposite sides of the portions carrying the rollers to receive the strips or plates of the stakes and hold the latter to the cross-beams.

11. Means for transporting lumber comprising a vehicle with a roller bed for receiving the lumber, said bed being made up of a series of rollers journaled for rotation on the vehicle with each roller terminating in a journaled extension shaped for the application of a turning tool, and locking means for the rollers comprising a strip with passages therethrough to engage over the journal extensions of the adjacent roller, the spacing of the passages in the strip corresponding to the distance between the rollers.

In testimony that we claim the foregoing as our own, we have hereto affixed our signatures.

GEORGE E. WATERS.
GEORGE M. STEVENSON.